United States Patent [19]

Jamasbi et al.

[11] Patent Number: 6,015,871
[45] Date of Patent: Jan. 18, 2000

[54] LOW VOC ULTRA HIGH SOLIDS THERMOSETTING COATING COMPOSITION AND METHOD OF ITS PREPARATION

[75] Inventors: Homayoun Jamasbi, Blue Bell; Kenneth Everett Wohltmann, Lansdale; Joseph John Spanier, Souderton, all of Pa.

[73] Assignee: Rohm and Haas Company, Philadelphia, Pa.

[21] Appl. No.: 09/088,234

[22] Filed: Jun. 1, 1998

Related U.S. Application Data

[60] Provisional application No. 60/048,749, Jun. 5, 1997.

[51] Int. Cl.⁷ .......................... C08G 18/40; C08G 18/62; C09D 175/04; C09D 175/16
[52] U.S. Cl. .................................. 528/48; 526/89
[58] Field of Search .................... 526/89; 528/48

[56] References Cited

U.S. PATENT DOCUMENTS

| | | | |
|---|---|---|---|
| 4,284,754 | 8/1981 | Chattha et al. | 528/107 |
| 4,426,510 | 1/1984 | DelDonno | 528/49 |
| 4,515,835 | 5/1985 | Kuhn et al. | 427/388.3 |
| 4,546,160 | 10/1985 | Brand et al. | 526/320 |
| 4,578,426 | 3/1986 | Lenz et al. | 525/131 |
| 4,652,605 | 3/1987 | Chang et al. | 525/10 |
| 5,663,233 | 9/1997 | Bederke et al. | 525/173 |

FOREIGN PATENT DOCUMENTS

| | | |
|---|---|---|
| 2213877 | 2/1998 | Canada . |
| 2 064 566 | 6/1981 | United Kingdom . |
| WO 96/20968 | 7/1996 | WIPO . |

*Primary Examiner*—Erma Cameron
*Attorney, Agent, or Firm*—Ronald D. Bakule, Patent Agent

[57] ABSTRACT

The present invention is directed to a low VOC ultra high solids thermosetting coating composition. A polymeric component of the composition includes a low molecular weight polymer polymerized from a monomer mixture containing less than 45 percent by weight of at least one active hydrogen containing monomer. The polymerization takes place in the presence of a reactive diluent. By including the reactive diluent in the polymeric component of the composition, the amount of solvent used in the composition can be substantially reduced, while still providing a pot mix of the composition with a viscosity sufficient to permit efficient coating application. The coatings from the composition are durable; glossy; impact and solvent resistant; and adherent to a wide variety of substrates, such as automobile bumpers, road surfaces and office equipment. The surface of these coatings when subjected to scuffing or surface marring action can be substantially restored to its original condition by simply buffing or polishing the marred or scuffed surface. The invention is also directed to include a combination of chemicals in the thermosetting composition containing an isocyanate cross linking component. Such a combination simultaneously increases the pot life of the pot mix while decreasing the drying time of a coating from the pot mix at ambient temperature over a wide variety of substrate surfaces.

4 Claims, No Drawings

LOW VOC ULTRA HIGH SOLIDS THERMOSETTING COATING COMPOSITION AND METHOD OF ITS PREPARATION

This application claims of U.S. Provisionial Application No. 60/048749, filed Jun. 5, 1997.

FIELD OF THE INVENTION

The present invention is generally directed to solvent based thermosetting compositions and more particularly to low VOC (volatile organic component) ultra high solids thermosetting compositions.

BACKGROUND OF THE INVENTION

The artisans in the coatings art have sought, throughout the history, to produce coating compositions, which produce coatings that dry or cure quickly upon application, have desired coating properties, such as high degree of adherence to a wide variety of underlying substrates, increased water and solvent resistance, high degree of durability and gloss. Simultaneously such compositions are also expected to permit the user to efficiently apply such coatings with conventional application means, such as spray guns, paint brushes or paint rollers preferably under ambient conditions. In addition to the foregoing desired coating composition characteristics, there is an increasing expectation and in most countries legally mandated requirement, that such coating compositions do not adversely affect the air quality by releasing excessive amounts of VOCs in the air. As a result, the environmental laws of various countries have reduced, and are expected to reduce even further the amount of VOCs permitted to be released in the air by coating compositions, such as, paints. The low VOC content requirement is of particular importance and relevance for solvent borne coating compositions as compared to waterborne coating compositions. Thus, there exists a need to have low VOC solvent borne coating compositions having most of the foregoing desired coating properties.

Some of the means employed in the past to achieve the foregoing objectives were to reduce the molecular weight of a polymer and to reduce the amount of solvent used during the polymerization of the polymer used in the coating composition. The rationale behind this approach was that by reducing the amount of solvent used during the polymerization, the VOC of the resulting solvent borne coating composition can be reduced. However, there are practical limits to reducing the amount of solvent used during the polymerization of a conventional polymer, typically to no less than 20 weight percent based on the total weight of the coating composition. If attempted, the resulting coating compositions become too viscous and therefore become too difficult to apply over surfaces.

Chang et al. in U.S. Pat. No. 4,652,605 (hereafter the '605 patent) attempted to solve this problem by utilizing a low molecular weight polymeric reaction product resulting from vinyl addition polymerization of a vinyl monomer component of which at least 50 percent by weight is an active hydrogen containing monomer. The addition polymerization in the '605 patent is conducted in the presence of a polymeric diluent. Since the composition in the '605 patent utilizes a polymeric product having 50 or more percent by weight of active hydrogen containing monomers, a substantial amount of crosslinking component needs to be mixed with the polymeric reaction product to prepare a pot mix having a workable degree of cure. As a result, such pot mixes have a short pot life. Moreover, the thermosetting compositions containing low molecular weight polymers tend to be soft. The thermosetting composition of the present invention solves this problem by providing for a low VOC thermosetting composition having a low viscosity and extended pot life while still providing desired coating properties.

STATEMENT OF THE INVENTION

The present invention is directed to a low VOC ultra high solids thermosetting coating composition comprising:

a polymeric component which comprises a polymer and a reactive diluent, said polymer resulting from polymerization in the presence of said reactive diluent of a monomer mixture comprising in the range of from 5 weight percent to 45 weight percent of at least one active hydrogen containing monomer, said weight percentages being based on the total weight of polymeric component solids and said polymer having a GPC weight average molecular weight varying in the range of from 3,000 to 12,000.

The present invention is further directed to a method of producing a coating on the surface of a substrate comprising:

mixing a polymeric component of a low VOC ultra high solids thermosetting coating composition with a cross linking component of said coating composition to form a pot mix, said polymeric component comprising a polymer and a reactive diluent, said polymer resulting from polymerization in the presence of said reactive diluent of a monomer mixture comprising in the range of from 5 weight percent to 45 weight percent of at least one active hydrogen containing monomer, said weight percentages being based on the total weight of polymeric component solids and said polymer having a GPC weight average molecular weight varying in the range of from 3,000 to 12,000;

applying under ambient conditions a layer of said pot mix on the surface of said substrate; and curing said layer to form said coating on said surface.

The present invention is still further directed to a method producing a low VOC ultra high solids thermosetting coating composition comprising:

adding a feed over a time period varying in the range of from 1 hour to 30 hours to a reactor charge maintained at a temperature varying in the range of from 140° C. to 220° C. and a pressure varying in the range of from 0.703 kilograms/sq. cm. (10 psig) to 7.03 kilograms/sq. cm. (100 psig) and comprising a reactive diluent, said feed comprising in the range of from 0.5 weight percent to 5 weight percent of a free radical initiator and a monomer mixture comprising in the range of from 5 weight percent to 45 weight percent of at least one active hydrogen containing monomer, said weight percentages being based on the total weight of polymeric component solids; and polymerizing said monomer mixture into said polymer having a GPC weight average molecular weight varying in the range of from 3,000 to 12,000.

One of the many advantages of the presently claimed thermosetting composition is its ability to form self healing durable coatings over a variety of wide ranging substrates. The term "self healing" means a coating that can be restored to its original appearance by simply buffing or polishing the coating which had previously been scuffed or marred.

Still another advantage of the presently claimed thermosetting composition is that a coating therefrom can be efficiently applied with conventional application means, such as spray guns, paint brushes or paint rollers over a wide variety of substrate surfaces.

Yet another advantage of the presently claimed thermosetting composition is its ability to cure under ambient conditions.

One of the unexpected advantages of the present composition over conventional compositions is that it provides extended pot life while still providing a coating composition with low VOC and desired coating characteristics.

DETAILED DESCRIPTION OF THE INVENTION

As used herein:

"Thermosetting Compositions (or systems)" means a coating composition which includes a polymeric component and a crosslinking component. These components are stored separately and then mixed together just before use to form a pot mix. The user then applies a layer of the pot mix over substrate surfaces to produce a coating thereon.

"Pot life" refers to the period of time at the end of which the initial viscosity of a pot mix doubles. The initial viscosity is the viscosity of the pot mix measured soon after the mixing of the polymeric and crosslinking components.

"Low VOC composition" means a coating composition having less than 419.44 grams of VOC per liter (3.5 pounds of VOC per gallon) of the composition.

"Ultra high solids composition" means a coating composition having solids content ranging from 80 weight percent to 95 weight percent, all weight percentages being based on the total weight of the composition.

"Polymer or composition solids" means polymer or composition in its dry state.

Ranges specified are to be read as inclusive, unless specifically identified otherwise.

"Hydroxyl Number (OH number)" means milligrams (mgs) of potassium hydroxide (KOH) equivalent to the hydroxyl content of 1 gram of polymer solids. The OH number is calculated from the following equation:

(% OH containing monomer in polymer/100)×(1000milliequivalents/monomer's formula weight)×56.1 (molecular weight of KOH).

"Hydroxyl Equivalent Weight (HEW)" means weight in grams of polymer solids containing one gram-equivalent weight of the hydroxyl functional monomer. The HEW is calculated from the following equation:

Hydroxyl Equivalent Weight=56,100/OH number

"GPC weight average molecular weight" means the molecular weight determined by gel permeation chromatography (GPC), using a differential refractometer as a detector. A set of 3 GPC columns packed with styrene/divinyl benzene beads having pore sizes in the range 100 to 10,000 angstroms, were used during the analysis. The solvent used was tetrahydrofuran (THF), flowing at a rate of 1.0 ml/min. through the GPC columns. The temperature of the columns was maintained at 40° C.

The instrument was first calibrated for molecular weight using narrow distribution polystyrene standards purchased from Polymer Laboratories, Amherst, Mass. and American Polymer Standards Co., Mentor, Ohio. These standards of known peak molecular weight have polydispersities (weight average molecular weight/number average molecular weight) ranging from 1.05 to 1.10. The standards ranging from 162 daltons to 28,500 daltons were used for the calibration. To determine the molecular weight calibration, a solution of the standards was prepared at a concentration of 1 milligram per milliliter of THF and 100 microliters of the solution was injected on to the GPC columns. Data were collected and processed by a dedicated GPC chromatography data system from Polymer Laboratories, Amherst, Mass. The elution volume of the peak of each standard was determined by the data system. A calibration logarithm representing elution time on abscissa and corresponding peak molecular weight of the standard on the Y axis of the logarithm was prepared.

A solution of sample being analyzed for its weight average molecular weight was prepared at a concentration of about 2.5 milligrams per milliliter of THF, shaken for several hours and then filtered through a 0.45 micron membrane filter. One hundred microliters of this solution was injected onto the GPC columns under the same conditions as those used in analyzing the calibration standards. The weight average molecular weight of the sample was determined by using the following equation:

Weight average molecular weight (Mw)=Σ(R×M)ΣH where R is the detector response measured above baseline at a given time and M is the molecular weight at that time, as determined from the calibration logarithm. The summation was made for the elution time at peak start to the elution time at peak end. This summation was the number reported as the weight average molecular weight.

"Reactive Diluent" means a low viscosity polymerization medium that is essentially inert to both the reactants and the resulting polymer. By essentially inert is meant that the reactive diluent does not participate in the polymerization of a monomer mixture to any appreciable extent and, therefore, is not incorporated into the polymer to any substantial degree. However, a reactive diluent has ability to cross link with a cross linking component of the coating composition to effectively reduce the VOC used in coating composition.

The VOC content of the thermosetting composition is less than 419.44 grams of VOC per liter (3.5 pounds of VOC per gallon) of the composition, which is the current upper VOC limit for the amount of VOC that may be released in the air by coating compositions in the United States. However, this upper VOC limit is expected to drop substantially over the years as tighter air quality standards are established under the environmental protection laws of many countries, including the United States. The VOC content of the present thermosetting composition preferably varies in the range of from 119.84 grams (1.0 pound) to 335.55 grams (2.8 pounds), and more preferably in the range of from 155.79 grams (1.3 pounds) to 215.71 grams (1.8 pounds), of VOC, all per liter (gallon) of the composition.

The solids content of the polymeric component varies in the range of from 80 weight percent to 95 weight percent, preferably in the range of from 85 weight percent to 95 weight percent and more preferably in the range of from 88 weight percent to 92 weight percent, all weight percentages being based on the total weight of the polymeric component. Just before use, the polymeric and the cross linking components are mixed to form a pot mix, which is then applied by conventional means, such as by paint brush or spraying, as a layer over the surfaces of substrates. The layer then cures into a coating having the desired properties, such as high gloss, good adhesion to a wide variety of substrates, durability, impact and solvent resistance, and especially mar resistance.

The polymeric component of the thermosetting composition includes a polymer, which is produced by polymerizing a monomer mixture in the presence of a reactive diluent. The monomer mixture comprises in the range from 5 to 45 weight percent, preferably, in the range from 10 to 35 weight percent and more preferably in the range from 10 to 20 weight percent of at least one active hydrogen containing monomer, all the weight percentages being based on the total weight of polymeric component solids. The presence of at least one active hydrogen containing monomer in the monomer mixture results in providing the resulting polymer with active hydrogen functionalities, such as those resulting from hydroxyl, amine and acid functionalities.

If the total amount of the active hydrogen containing monomers in the monomer mixture exceeds 45 percent by weight, a thermosetting composition containing such a polymer would exhibit reduced pot life, open time and would have unacceptably high working viscosity and if the total amount of the active hydrogen containing monomers in the monomer mixture drops below 5 percent by weight, the coating properties of the resultant coating, such as, solvent and abrasion resistance will suffer. Such a loss of properties results, it is believed, without reliance thereon, from the presence of fewer active hydrogen sites available for cross linking with a cross linking component of the thermosetting composition.

The polymer is provided with a GPC weight average molecular weight varying in the range of from 3,000 to 12,000, preferably in the range of from 4,000 to 10,000 and most preferably in the range of from 6,000 to 9,000. The polydispersity of the polymer typically ranges from 1.5 to 6.0, preferably ranges from 1.5 to 3.0. If the GPC weight average molecular weight of the polymer is less than 3,000, a coating resulting from a thermosetting composition containing such a polymer would be too soft, which thereby would result in loss of coating properties, such as, durability, chemical resistance and gloss retention. If the GPC weight average molecular weight of the polymer exceeds 12,000, a thermosetting composition, which includes such a polymer would have unacceptably high working viscosity.

The Tg of the polymer as determined by using Fox equation typically varies in the range of from −40° C. to 150° C.

Preferred examples of the active hydrogen containing monomers include hydroxy functional monomers, such as 2-hydroxyethyl acrylate, 2-hydroxyethyl methacrylate, 2-hydroxypropyl acrylate, 2-hydroxyethyl acrylate, 2-hydroxypropyl methacrylate, 2-hydroxybutyl methacrylate, 1,4-butanediol acrylate or methacrylate, hydroxyethyl fumarate, butyl hydroxyethyl maleate, and hydroxyethyl oxyethyl methacrylate. More preferred active hydrogen containing monomers include 2-hydroxypropyl methacrylate or 2-hydroxyethyl methacrylate.

Other active hydrogen containing monomers include the following classes of amine containing monomers:

Class 1. Aminoalkyl vinyl ethers, wherein alkyl groups may be straight- or branched-chains having two to three carbon atoms and wherein nitrogen atom may be a primary, secondary, or tertiary nitrogen atom. When the monomer containing a tertiary nitrogen atom is utilized, one of the remaining hydrogen atoms may be substituted by alkyl, hydroxyalkyl, or alkoxyalkyl groups, the alkyl components of which may have one to four carbon atoms, preferably one carbon atom. Specific examples include: beta -aminoethyl vinyl ether; beta-aminoethyl vinyl sulfide; N-monomethyl-beta-aminoethyl vinyl ether or sulfide; N-monoethyl- beta -aminoethyl vinyl ether or sulfide; N-monobutyl- beta -aminoethyl vinyl ether or sulfide; and N-monomethyl-3-aminopropyl vinyl ether or sulfide.

Class 2. Acrylamide or acrylic esters, such as, those of the formula I:

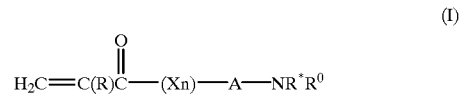

(I)

wherein:

R is H or CH$_3$;

n is 0 or 1;

X is O or N(H).

When n is zero, A is O(CH$_2$)$_x$, wherein x is 2 to 3, or (O-alkylene)$_y$;

wherein (O-alkylene)$_y$ is a poly(oxyalkylene) group, having a GPC number average molecular weight in the range from 88 to 348, in which the individual alkylene radicals are the same or different and are either ethylene or propylene; and when n is 1, A is an alkylene group having 2 to 4 carbon atoms;

R* is H, methyl, or ethyl; and

R$^0$ is H, phenyl, benzyl, methylbenzyl, cyclohexyl, or (C$_1$–C$_6$) alkyl.

Some of the preferred examples of compounds of formula I include methylaminoethyl acrylate or methacrylate; beta -aminoethyl acrylate or methacrylate; N,N'-dimethylamino acrylate or methacrylate; N,N'-dimethylamino acrylonitrile or methacrylonitrile; beta -aminoethyl acrylamide or methacrylamide; N-(monomethylaminoethyl)-acrylamide or methacrylamide; N-(mono-n-butyl)-4-aminobutyl acrylate or methacrylate; methacryloxyethoxyethylamine; and acryloxypropoxypropoxypropylamine.

Class 3. N-acryloxyalkyl-oxazolidines and N-acryloxyalkyltetrahydro-+b1,3-oxazines and the corresponding components in which the "alkyl" linkage is replaced by alkoxyalkyl and poly(alkoxy-alkyl), all of which are embraced by Formula II:

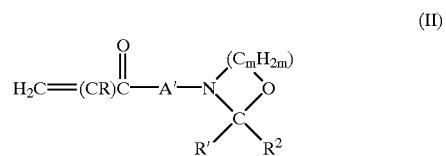

(II)

wherein R is H or CH$_3$;

m is an integer having a value of 2 to 3;

R', when not directly joined to R$^2$, is selected from the group consisting of hydrogen, phenyl, benzyl, and (C$_1$–C$_{12}$) alkyl groups;

R$^2$, when not directly joined to R', is selected from the group consisting of hydrogen and (C$_1$–C$_4$) alkyl groups;

R' and R$^2$, when directly joined together, form a 5- to 6-carbon ring with the attached carbon atom of the ring in the formula, i.e., R' and R$^2$, when joined together, are selected from the group consisting of pentamethylene and tetramethylene; and A' is O(C$_m$H$_{2m}$)- or (O-alkylene)$_n$ in which (O-alkylene)$_n$ is a poly(oxyalkylene) group, having a GPC number average molecular weight in the range from 88 to 348 and in which the individual alkylene radicals are the same or different and are either ethylene or propylene.

The compounds of Formula II can hydrolyze under various conditions to secondary amines. The hydrolysis produces products having the Formula III:

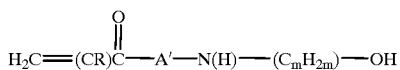

(III)

Some of the preferred examples of compounds of Formula III include oxazolidinylethyl methacrylate; oxazolidinylethyl acrylate; 3-(gamma-methacryloxypropyl)-tetrahydro-1,3-oxazine; 3-( beta -methacryloxyethyl) -2,2-penta-methylene-oxazolidine; 3-( beta -methacryloxyethyl-2-methyl-2-propyloxazolidine; N-2-(2-acryloxyethoxy) ethyl-oxazolidine; N-2-(2-methacryloxyethoxy)ethyl-oxazolidine; N-2-(2-methacryloxyethoxy)ethyl-5-methyl-oxazolidine; N-2 -(2-acryloxyethoxy)ethyl-5 -methyl-oxazolidine; 3- [2 -(2 -methacryloxyethoxy)ethyl)]-2,2-penta-methylene-oxazodine-3-[2-(2-methacryloxyethoxy) ethyl)]-2,2-dimethyloxazolidine; 3-[2-(methacryloxyethoxy)ethyl]-2-phenyl-oxazolidine; 2-isopropenyl-2-oxazone.

Class 4. Imines, such as, ethylene imine, propylene imine or combinations thereof.

The other suitable active hydrogen containing monomers include acid monomers preferably ethylenically-unsaturated carboxylic acid monomers, such as acrylic acid, fumaric acid-monoethyl ester, fumaric acid, itaconic acid, maleic acid, maleic anhydride, methacrylic acid, fumaric acid-monomethyl ester, methyl hydrogen maleate, 2-acrylamido-2-methylpropane sulfonic acid, sodium vinyl sulfonate, sulfoethyl methacrylate, or various combinations thereof. More preferred ethylenically-unsaturated carboxylic acid monomer includes acrylic acid, methacrylic acid, or combinations in various proportions thereof.

Mixtures of the aforesaid active hydrogen containing monomers may also be utilized if desired.

The balance of the monomer mixture can include a variety of other monomers. For example, alkyl acrylates and methacrylates which contain from 1 to 18 carbon atoms, preferably 4 to 10 carbon atoms in the alkyl portion, such as methyl(meth)acrylate, ethyl (meth)acrylate, propyl(meth)acrylate and butyl(meth)acrylate, 2-ethylhexyl methacrylate, stearyl methacrylate, and isobornyl methacrylate.

Besides the acrylates and methacrylates, other copolymerizable monomers which can be copolymerized with the active hydrogen containing monomers include ethylenically unsaturated materials, such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids. Examples of such monomers include styrene, 1,3-butadiene, acrylonitrile, alpha-methyl styrene, alpha-methyl chlorostyrene, vinyl butyrate, vinyl acetate, allyl chloride, divinyl benzene, diallyl itaconate, triallyl cyanurate, vinyl toluene and mixtures thereof.

As stated earlier, the polymer is produced by polymerizing the monomer mixture in the presence of the reactive diluent. The selection of reactive diluent and the amount of reactive diluent used depends upon the degree of solubility of the monomer mixture in the reactive diluent at a particular reaction temperature being employed during the polymerization. Preferably, the monomers in the monomer mixture are sufficiently soluble in the reactive diluent to form a homogenous reaction mixture under the polymerization conditions. If the monomers in the monomer mixture are not sufficiently solvated in the reactive diluent, incomplete or partial polymerization of the monomer mixture may result. The reactive diluent is not removed at the completion of the polymerization and it becomes part of the polymeric component. Generally, the polymeric component includes in the range of from 10 weight percent to 50 weight percent, preferably in the range of from 20 weight percent to 40 weight percent and more preferably in the range of from 25 weight percent to 35 weight percent of the reactive diluent, all percentages being based on the total weight of the polymeric component.

The reactive diluent contains one or more active hydrogen functionalities. Examples of suitable reactive diluents include non-polymeric polyfunctional amine having at least 2 primary or secondary amino groups, saturated polyester polyols, polylactone polyols, acrylic polyols and polyether polyols.

The examples of non-polymeric polyfunctional amine reactive diluents include aliphatic and cycloaliphatic amines each having 2 to 10 primary or secondary amino groups and 2 to 100 carbon atoms. Preferred non-polymeric polyfunctional amines include 2 to 4 primary amino groups and 2 to 20 carbon atoms. Still further in this regard, suitable non-polymeric polyfunctional amines include, but not limited to, hexamethylene diamine; 2-methyl pentamethylene diamine; 1,3-diamino propane; 1,3-diamino pentane; dodecane diamine; 1,2-diamino cyclohexane; 1,4-diamino cyclohexane; para-phenylene diamine; 3-methyl piperidine; piperazine; N-amino ethylpiperazine; isophorone diamine; bis-hexamethylene triamine; diethylene triamine; ethylene diamine; diethylamine triamine; triethylene tetramine; tris (2-aminoethyl) amine; ethylene oxide-amine; polyoxyalkylene amines, such as, Jeffamine®D, ED and T series polyoxypropylene amine, supplied by Texaco Chemical Company of Houston, Tex.; amine-functional acrylic resins, disclosed in U. S. Pat. No. 4,120,839; trimethyl hexamethylene diamine; and tetraethylene pentamine. Mixtures of these non-polymeric polyfunctional amine can also be used. The more preferred non-polymeric polyfunctional amine is a polyoxypropylene amine having the formula:

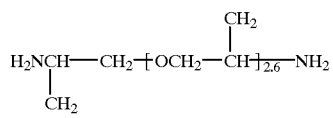

which is supplied under the trademark Jeffamine ® D-230 polyoxypropylene amine by Texaco Chemical Company, Houston, Tex.

The examples of saturated polyester polyol reactive diluents include those prepared from a polyhydric alcohol and a saturated polycarboxylic acid including any anhydrides thereof. Usually the polyhydric alcohol is an aliphatic glycol having from 2 to 10 carbon atoms. Suitable aliphatic glycols include ethylene glycol, propylene glycol, butylene glycol, neopentyl glycol, diethylene glycol, triethylene glycol, dipropylene glycol, tripropylene glycol, 1,5-pentanediol, 1,4-cyclohexane dimethanol, and hexamethylene glycol. Mixtures of these glycols may be used if desired. Usually the saturated polycarboxylic acid is a saturated dicarboxylic acid having from 4 to 20 carbon atoms or any anhydrides thereof. Suitable saturated aliphatic dicarboxylic acids include succinic acid, glutaric acid, adipic acid, pimelic acid, suberic acid, azeleic acid, and sebacic acid. Also useful herein are aromatic dicarboxylic acids including phthalic acid, isophthalic acid, terephthalic acid, tetrahydrophthalic acid, hexahydrophthalic acid and any anhydrides thereof.

The examples of polylactone polyol reactive diluents include those prepared from the reaction of a lactone such as ε-caprolactone and a polyol. For example, the diethylene glycol ε-caprolactone based polymers commercially available from Union Carbide as PCP-0200 or PCP-0220 are quite suitable herein.

The examples of acrylic polyols include interpolymers of hydroxy-containing vinyl monomers such as, hydroxyalkyl acrylate and methacrylate having 2 to 6 carbon atoms in the alkyl group and other ethylenically unsaturated copolymerizable materials, such as alkyl acrylates and methacrylates.

Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid.

Examples of suitable alkyl acrylates and methacrylates are lauryl methacrylate, 2-ethylhexyl methacrylate, dimethyl aminoethyl methacrylate, n-butyl acrylate and preferably t-butyl aminoethyl methacrylate.

Examples of polyether polyol reactive diluents are polyalkylene ether polyols which include those having the following structural formula:

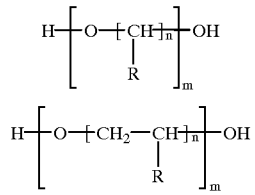

where the substituent R is hydrogen or lower alkyl containing from 1 to 5 carbon atoms including mixed substituents, and n is typically from 2 to 6 and m is from 2 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers.

Also useful are polyether polyol reactive diluents formed from oxyalkylation of various polyols, for example, glycols such as, ethylene glycol, 1,6-hexanediol and Bisphenol A, or other higher polyols, such as trimethylolpropane and pentaerythritol. One commonly utilized oxyalkylation method is by reacting a polyol with an alkylene oxide, for example, ethylene or propylene oxide, in the presence of an acidic or basic catalyst.

A polyester diol having a hydroxyl number within the range of 80 to 600 is a more preferred reactive diluent.

During the vinyl addition polymerization, the rate at which the monomer mixture is added to a reaction mixture in the reactor vessel, is controlled to either consume all the monomer mixture being added or the amount of unreacted monomer mixture in a reactor, on the average, does not exceed 30 percent by weight of the total weight of the reaction mixture. Preferably the amount of unreacted monomer mixture varies in the range from 0.1 percent to 15 percent, more preferably it varies in the range from 0.1 percent to 10 percent, all in weight percentages based on the total by weight of the reaction mixture. The term reaction mixture means all the contents in the reactor vessel, such as the monomer mixture, reactive diluent, solvent and an initiator.

It is believed that the rapid rate of polymerization enhances the probability of chain transfer and chain termination reactions which limit the molecular weight of the polymer which is formed. One way to achieve these conditions is to keep the monomer concentration low by utilizing a slow rate of monomer mixture addition; generally the rate of addition can range from 1 hours to 30 hours, although more typically addition is carried out over a period ranging from 2 hours to 15 hours, preferably over a period ranging from 3 hours to 6 hours.

The vinyl addition polymerization is carried out in the presence of an initiator under atmospheric pressure at a reaction temperature in the range of from 100° C. to 130° C. The choice of initiator and the reaction temperature is largely dependent upon the particular choice of the reactive diluent used during the polymerization. The amount of initiator used typically ranges from about 8 percent to about 15 percent, all being in weight percentages based on the polymeric component solids.

Applicants have unexpectedly discovered that by increasing the pressure in the reactor above the atmospheric pressure, the reaction temperature can be increased at the same or increased rate of addition of the monomer mixture while utilizing less amount of initiator during the polymerization. By way of example, if the monomer mixture is added under the atmospheric pressure over the range of from 3 to 7 hours, a reaction temperature of 100° C. to 130° C. can be attained without boiling off the reaction mixture and 8 percent to 15 percent by weight of the initiator is required to efficiently polymerize the monomer mixture, all being in weight percentages based on the polymeric component solids. However, by raising the reaction pressure in the range of from 2.109 kilograms/sq. cm. (30 psig) to 5.624 kilograms/sq. cm. (80 psig), a reaction temperature can be raised to 180° C. to 195° C., without boiling off the reaction mixture and the amount of initiator added to the reactor charge can be substantially decreased to 1 percent to 3 percent by weight of the initiator to efficiently polymerize the monomer mixture, all being in weight percentages based on the polymeric component solids. Thus, to complete the polymerization at a reaction pressure in the range of from 0.703 kilograms/sq. cm. (10 psig) to 7.03 kilograms/sq. cm. (100 psig), preferably in the range of from 2.109 kilograms/sq. cm. (30 psig) to 5.624 kilograms/sq. cm. (80 psig), and a reaction temperature in the range of from 140° C. to 220° C., preferably 170° C. to 200° C., 0.5 percent to 5.0 percent, preferably in the range of from 1.0 percent to 3.0 percent of the initiator is required, all being in weight percentages based on the polymeric component solids.

Initiators suitable for use in the present invention, preferably free radical initiators, include dialkyl peroxides, such as dicumyl peroxide and di-t-butyl peroxide; peroxyesters, such as t-butyl peroctoate, t-butyl perbenzoate, t-butyl peracetate, t-amyl peroctoate, t-amyl perbenzoate, and t-amyl peracetate; diacyl peroxides, such as dibenzoyl peroxide, diacetyl peroxide, and dilauroyl peroxide; tertiary alkyl hydroperoxides, such as cumene hydroperoxide, t-butyl hydroperoxide and t-amyl hydroperoxide; peroyketals, such as ethyl 3,3-di(t-butylperoxy)-butyrate and 1, 1-di(t-amylperoxy)-cyclohexane. Also useful are azo initiators, such as 2,2'-azobis (2-methylpropanenitrile), 2,2'-azobis (2-methylbutanenitrile), and 1,1'-azobis (cyclohexanecarbonitrile). Dialkyl peroxides are preferred and di-t-butyl peroxide is most preferred.

For the purposes of regulating the molecular weight of the polymer being formed, suitable chain-transfer agents may be used. Typically the lower the amount of chain transfer agent used, the higher will be the molecular weight of the resulting polymer and vice versa. Thus, in order to produce a polymer of having the GPC weight average molecular weight in the desired range stated earlier, the chain-transfer agent in the range of from 1 to 20 percent, preferably in the range of from 2 to 10 and more preferably in the range of from 5 to 8 percent, is added to the reaction mixture, typically before the initiation of the polymerization process. All the foregoing percentages are weight percentages based on the total weight of the polymeric component solids. The amount of a chain-transfer agent needed to achieve a particular molecular weight, moreover, can be estimated by the use of the Mayo equation. (See, e.g., pages 226–233 of a text entitled *Principles of Polymerization,* second edition, by George Odian, published 1981 by John Wiley & Sons, Inc.).

Some of suitable chain transfer agents include butyl mercapto propionate; iso octyl mercapto propionic acid; 3-mercapto propionic acid; isooctyl mercapto propionate; tert-butyl and ethyl mercaptoacetate; alkyl mercaptans, such as ethyl mercaptan, ethyl mercaptan, hexyl mercaptan, n-dodecyl mercaptan, 1-dodecanethiol, tertiary-dodecyl mercaptan, octyl mercaptan, tetradecyl mercaptan, and hexadecyl mercaptan; or various combinations thereof.

The vinyl addition polymerization reaction can be monitored by periodic determination of the concentration of free vinyl monomer component in the reaction mixture by gas chromatography, high pressure liquid chromatography, or proton nuclear magnetic resonance spectroscopy. Typically, gas chromatography is utilized in conjunction with solids determinations. As was stated above, the concentration of unreacted vinyl monomer, on the average, should always be less than 30 percent by weight of the total weight of the reaction mixture. When the monomer addition is complete, heating is continued with or without the addition of further initiator until there is essentially complete conversion of the monomer mixture to the polymer. At the end of the polymerization, the reactive diluent is not separated or removed the resulting polymer and it becomes part of the polymeric component.

The weight average molecular weight of the polymer was determined by gel permeation chromatography (GPC) as detailed earlier. It should be understood that since a reactive diluent is utilized during the polymerization, the molecular weight which is determined by the method described earlier reflects a contribution from the polymer formed during the polymerization and a contribution from the reactive diluent. In order to arrive at a weight average molecular weight which is indicative solely of the contribution of the polymer, the contribution of the reactive diluent must be mathematically removed. The manner in which this was accomplished is art-recognized; therefore, a detailed discussion is felt not to be necessary for the purposes of this application.

The viscosity of the polymeric component typically varies in the range of from 100 cps to 15,000 cps, preferably in the range of from 1,000 cps to 10,000 cps and more preferably in the range of from 4,000 cps to 8,000 cps, all viscosity measurement being conducted at 25° C. using No. 3 spindle at 12 rpm or at 6 rpm on Brookfield Model LVTD-II Viscometer supplied by Brookfield Engineering Laboratories INC., Stoughton, Mass.

The composition of the present invention preferably includes a small amount of a solvent, which varies in the range of from 5 percent to 20 percent, preferably in the range of from 5 percent to 10 percent and more preferably in the range of from 8 percent to 12 percent, all in weight percentages based on the total weight of the thermosetting composition. The solvent is preferably added to the polymeric component. The small amount of solvent is typically added to reduce the viscosity of the pot mix of the composition of the present invention to less than 1500 cps, provided the VOC of the composition does not exceed more than 419.44 grams of VOC per liter (3.5pounds of VOC per gallon) of the coating composition. The solvent may be added before, during or after the polymerization of the monomer mixture into the polymer. Some of the suitable solvents include aromatic hydrocarbons, such as benzene, toluene, xylene, Aromatic-100™ and Aromatic-15™ aromatic solvents marketed by Exxon Corporation, Houston, Tex.; alcohols, such as ethanol, iso-propanol, n-butanol, t-butanol, and ethylhexanol; esters, such as ethyl acetate, propyl acetate, butyl acetate, isobutyl acetate, dibasic esters, propylene glycol monomethylether acetate, ethylene glycol monomethylether acetate, and Exxate™ ester solvents marketed by Exxon Corporation, Houston, Tex. Other useful solvents include ketones, such as, methyl ethyl ketone, methyl amyl ketone, methyl isobutyl ketone, diacetone alcohol, 2,4-pentanedione, and isophorone; glycols, such as propylene glycol and diethyl glycol; glycol ethers, such as propylene glycol monomethylether, ethylene glycol monomethylether, dipropylene glycol monomethylether, n-propoxypropanol, chlorinated solvents, such as methylene chloride, ethylene dichloride, 1, 1, 1-trichloroethane, and perchlorethylene; and fluorinated solvents, such as benzotrifluoride and p-chlorobenzotrifluoride. Various combination of solvents, such as butyl acetate and methyl ethyl ketone, or propylene glycol monomethylether acetate and methyl amyl ketone or butyl acetate and 2,4-pentanedione can be used. Butyl acetate with 2,4-pentandione is the preferred choice.

The thermosetting composition of the present invention further includes the cross linking component stored separately from the polymeric component. The cross linking component is provided with hydrogen reactive groups capable of reacting with the active hydrogen functionalities of the polymeric component, i.e., the active hydrogen functionalities on the polymer and the reactive diluent. Generally a molar equivalent amount of the cross linking component is mixed with a molar equivalent amount of the polymeric component to form the pot mix. Preferably, the cross linking component is mixed with the polymeric component in a proportion, expressed as a ratio of the hydrogen reactive functionalities on the crosslinking component to the active hydrogen functionalities on the polymeric component, in the range of from 1.0 to 1.4, preferably in the range of from 1.0 to 1.25 and most preferably in the range which varies from 1.0 to 1.2. The ratio in the foregoing range ensures that sufficient degree of reactivity is maintained between the reactive groups on the cross linking component and the polymeric component. If the ratio drops below the lower limit of the foregoing range, desired degree of curing will not occur and if the ratio exceeds the upper limit of the foregoing range, excessive cross linking will occur thereby reducing the pot life of the thermosetting composition of the present invention.

Examples of suitable cross linking component are aminoplast, isocyanates and blocked polyisocyanates. Isocyanates are preferred.

Aminoplast are obtained from the reaction of formaldehyde with an amine or an amide. The most common amines or amides are melamine, urea or benzoguanamine. However, aminoplasts made from other amines and amides can be also employed, such as for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, ethylene diurea, N-phenylurea, formoguanamine, acetoguanamine, 6-methyl-2,4-diamino-1,3,5-triazine, 3,5-diaminotriazole, triaminopyrimidine, 2,6-triethyltriamine-1,3,5-triazine, and various combinations thereof.

While the aldehyde employed in the preparation of the aminoplast is most often formaldehyde, other aldehydes such as acetaldehyde, crotonaldehyde, benzaldehyde and furfural may be also used. The aminoplast contains methylol or similar alkylol groups are preferably at least a portion up to essentially all of these alkylol groups are etherified by reaction with an alcohol to help provide organic solvent-soluble resins. Any monohydric alcohol can be employed for this purpose including such alcohols as methanol, ethanol, butanol and hexanol.

Preferred aminoplasts include melamine, urea- or benzoguanamine-formaldehyde condensates etherified with an alcohol containing 1 to 4 carbon atoms such as, methanol, ethanol, butanol or mixtures thereof.

A layer from the pot mix of the present invention containing an aminoplast crosslinking agent is typically cured at temperatures ranging from 200° C. to 300° C. for 15 to 20 minutes.

Suitable organic isocyanates for use in accordance with this invention include aliphatic diisocyanates, such as trimethylene diisocyanate, tetramethylene diisocyanate, pentamethylene diisocyanate, hexamethylene diisocyanate, octamethylene diisocyanate, decamethylene diisocyanate, butylene-1,2-diisocyanate, butylene-1,3-diisocyanate, ethylidene diisocyanate; cycloaliphatic diisocyanates, such as cyclohexylene diisocyanate, 4,4'-methylene bis(cyclohexyl isocyanate), 2,2,4-trimethylhexamethylene diisocyanate, dimer acid diisocyanate, 3-isocyanatomethyl-3,5,5-trimethylcyclohexyl-isocyanate; and aromatic diisocyanates; such as 2,4-toluene diisocyanate, 2,6-toluene diisocyanate, chlorinated toluene diisocyanates, meta-phenylene diisocyanate, chlorinated meta-phenylene diisocyanate, orthophenylene diisocyanate, brominated-meta-phenylene diisocyanate, meta-xylylene diisocyanate, para-xylylene diisocyanate, naphthalene-1,4-diisocyanate, naphthalene-1,5-diisocyanate, naphthalene-2,7-diisocyanate, 4'4-biphenylene diisocyanate, 3,3'-dichloro'4,4'-biphenylene diisocyanate, 3,3'-dimethyl-4,4'-biphenyl diisocyanate,3,3'-dimethoxy-4,4'-biphenylene diisocyanate, 2,2', 5,5'-tetramethyl-4,4'-biphentlene diisocyanate,2-nitro-4,4'biphenylene diisocyanate,3,3'-diphenyl-4,4'-biphenylene diisocyanate,4,4'-methylene-bis-(phenyl isocyanate), 4,4'-methylene-bis(2-methylphenyl isocyanate), 4,4'-isopropylene-bis(phenyl isocyanate), and fluorene diisocyanate; triisocyanates, such as hexamethylene diisocyanate biurets,4,4', 4"-triphenylmethane triisocyanate and toluene-2,4,6-triisocyanate; isocyanurates, such as those based on hexamethylene diisocyanate or 3-isocyanatomethyl-3,5,5-trimethylcyclohexyl-isocyanate; tetraisocyanates and mixtures thereof.

Particularly useful isocyanates are polyfunctional aliphatic isocyanates based on hexamethylene diisocyanate (HDI). Some of the commercial HDIs include Tolonate® HDT or Tolonate® HDT LV from Rhone-Poulenc Inc. (Organic Chemical Division), Monmouth Junction, N.J. or Desmodur® N-3300 or Desmodur® N-3390 isocyanate from Bayer AG, Pittsburgh, Pa.

One of the advantages of using the isocyanate component in the present thermosetting composition is that a layer from the pot mix containing such a crosslinking agent typically cures at ambient temperature.

If desired a isocyanate cross linking component in the form of a prepolymer may also be utilized for use in the thermosetting composition of the present invention. Generally, a polymer having active hydrogen functionalities, such as, polyol is pre-reacted with isocyanate to form a polyhydroxy- or polyisocyanate-terminated quasi-prepolymer. These prepolymers are used for various reasons, such as to reduce the exotherm of the final polymerization reaction, to reduce the toxicity of monomeric isocyanates, or to reduce the viscosity of a particular polyol or isocyanate by reacting it with a more liquid isocyanate or polyol. Polyisocyanate-terminated prepolymers are prepared by reacting an isocyanate with less than a stoichiometric amount of a polyol.

The thermosetting composition of the present invention containing the isocyanate cross linking component preferably also includes a catalyst. The catalyst may be added to the cross linking component or preferably to the polymeric component of the thermosetting composition. The polymeric component includes in the range of from 0.001 percent to 2.0 percent, preferably in the range of from 0.005 percent to 0.05 percent and more preferably in the range of from 0.008 percent to 0.012 percent of the catalyst, all in weight percentages based on the total weight of the polymeric component. It is generally believed that the presence of the catalyst in the polymeric component reduces the cure time required for the cross linking component to cross link with the polymer and the reactive diluent of the polymeric component. Some of the suitable catalysts include metal compounds, such as dibutyl tin dilaurate and ferric acetylacetonate; tertiary amines, such as triethylenediamine, N-alkyl morpholines, N,N,N',N'-tetramethyl-ethylene-diamine, N,N,N',N'-tetramethyl-1,3-butane-diamine, N,N'-substituted piperazines, and dialkyl-alkanol-amines; and various combinations thereof. Metal compounds are preferred and dibutyl tin dilaurate is particularly preferred.

Furthermore, the applicants have unexpectedly discovered that a ratio of pot life/drying time of the thermosetting composition can be increased by preferably adding a certain combination of chemicals, preferably to the polymeric component. An increase in the ratio of pot life/drying time, which is highly desired by artisans in the coating art, results in simultaneously extending the pot life while decreasing the drying time of a layer of the pot mix of the thermosetting composition applied over a substrate surface.

The combination of chemicals includes in the range of from 0.001 to 2.0 percent, preferably in the range of from 0.005 to 0.05 percent of a tin compound, such as dibutyl tin dilaurate; in the range of from 0.05 to 2 percent, preferably in the range of from 0.1 to 1 percent and more preferably in the range of from 0.2 to 0.7 percent of benzoic acid; and in the range of from 1 to 10 percent, preferably in the range of from 2 to 6 percent of 2,4 pentanedione, all percentages being in weight percents based on the total weight of polymeric component.

If desired and depending on the intended use of the composition, additional components may be added either to the polymeric component or to the crosslinking component or to both. These additional components include but are not limited to the following materials:

1. Additives, such as rheology modifiers, dispersants, wetting agents, slip agents, mar reducing agents, defoamers, plasticizers and corrosion inhibitors;

2. Pigments, which include organic pigments, such as phthalo blue, phthalo green and inorganic pigments, such as titanium dioxide;

3. Extenders, such as calcium carbonate, talc, clays, silicas and silicates; and 4. Fillers, such as glass or polymeric microspheres, quartz and sand.

The thermosetting composition of the present invention is particularly suitable for use in coatings requiring high coefficient of friction; soft tactile feel or touch; solvent, salt water or water resistance; externally applied water or paint repellence; abrasion resistance; energy and sound absorbence. The foregoing coating properties resulting from the use of the present thermosetting composition can be obtained over a wide variety of substrate surfaces, such as glass, metal, plastics, wood, leather, woven and non-woven fabrics and paper. Some of such examples include chip resistant primers; undercoats as well as high quality abrasion resistant OEM (original equipment manufacturer) applied and refinished coatings over interior and exterior surfaces of automobiles, trucks and trailers, airplanes, motorcycles, bicycles and home appliances; maintenance coatings over medical, industrial, construction, agricultural, amusement park and lawn care equipment; tanks; cranes and bridges.

The coating from the thermosetting composition of the present invention is suitable for coating over surfaces of substrates, such as wide variety of woven or non-woven cellulosic or non-cellulosic fabrics; leather or non-leather goods, such as shoes, boots, sandals, sneakers, gloves, hats and upholstery; various sports and athletics related footwear, such as sneakers, running shoes, roller blade shoes; foot ball shoes; sports and recreation equipment, such as golf clubs, balls, tees, skis, jet skis, wet bikes, snowmobiles, skates, hockey rink surfaces, hockey pucks and hockey sticks, bowling alley lanes, bowling pins and balls; fake fruits and dry flowers; fiber optics; packaging materials, such as bottles, beverage cases, food bags and boxes; finger nails and fake finger nails; safety glass, shatter-proof glass and eye wear glasses; plasticizer migration resistant coating over vinyl surfaces; furniture, including lawn furniture; roof and roof tiles; textured and soft-feel wall coverings; toys, such as Nerf™ ball; light fixtures and bulbs; communications equipment, such as phones, pagers and fax machines; credit cards; luggage and attachès touch screen television tubes, cathode ray tubes and radar screens, liquid crystal and flat panel displays; mirrors; non-skid floorings; sound absorbent acoustical walls, ceilings and seats, acoustical equipment; marine surfaces, such as boat hulls, buoys, jetties, ship decks, sail canvas; office equipment, such as computers, photocopying machines, computer printers; musical instruments, such as piano, guitars, organs; costume jewelry; and bright metallic surfaces.

Due to their protective nature, the thermosetting composition of the present invention may be used to protect substrates, such as toys or it may used as a protective cocooning coating over military hardware, such as vehicles, armor and missile surfaces Due to their durable nature, the coating from the thermosetting composition of the present invention may be used as durable long life traffic markings on road surfaces, including reflective road markings.

The thermosetting composition of the present invention may be foamed by conventional means, such as by air or inert gas foaming means, to produce foams, which can be applied over a wide variety of surfaces; cast; molded by conventional means, such as injection molding.

TESTING PROCEDURES

The following test procedures were used for generating the data reported in the Examples below:

1. Dry-to-touch time measured in hours under ASTM D-1640-83.

2. Gloss measured under ASTM D-523 (The 20 degree and 60 degree gloss were measured with glass meters manufactured by the Gardner Instrument Company).

3. Pencil Hardness measured under ASTM D-1737 (6H being the hardest pencil and 6B being the softest pencil).

4. Cross Hatch Adhesion measured under ASTM D-3359 (No coating peeling off the substrate surface, or total delamination of the underlying substrate surface, indicates perfect adhesion, i.e., a reading of 0%. All of the coating peeling off the substrate surface indicates total failure, i.e., a reading of 100%. Portions of the coating peeling off the surface are expressed in area percentages of the peeled off the surface).

5. Impact resistance measured under ASTM D 2794-90 (Resistance of organic coatings to the effect of rapid deformation).

5.1 Direct impact resistance is the resistance of a coating to cracking when it is directly exposed to impact load.

5.2 Reverse impact resistance is the resistance of a coating when the opposite side of a planar coated substrate is exposed to impact load.

Both the tests were expressed in inch pounds. The measurement was recorded as the highest load in inch pound at which no cracking or damage on a coating was observed. A reading of more than is 0.9216 meter kilograms (80 inch pounds) is considered very good and a reading of more than 0.6912 meter kilograms (60 inch pounds) is considered acceptable.

6. Acid Resistance measured under ASTM D 1308-87 (Effect of household chemicals on clear and pigmented organic Finishes).

7. Methyl Ethyl Ketone (MEK) Rubs measured under ASTM D 4752-87

8. Mar resistance is a subjective test in which the surface of the coating is scratched with a hard object such as finger nail or a coin. The rating is from 1 to 10. A reading of 10 indicates no mar (damage) and a reading of 1 indicates complete mar damage.

9. Viscosity measured under ASTM D 2196 (Rheological properties of non-Newtonian materials by rotational (Brookfield) viscometer).

The following examples are illustrative of the invention and are not meant to limit it to their details. The abbreviations below were used in describing the various monomers and reactive diluents in examples below:

MMA = Methyl Methacrylate
BA = Butyl Acrylate
Sty = Styrene
HEMA = hydroxyethyl methacrylate
JBOMA = Isobornyl Methacrylate
EHMA = ethyl hexyl methacrylate
DITBP = Di-t-butyl Peroxide
NBUAC = n-butyl acetate

EXAMPLE 1

A 4 liter stainless steel reactor vessel equipped with a thermocouple and reactant delivery pumps was charged with 359.2 grams of a reactive diluent known as Tone-201™ polycaprolactone diol, supplied by Union Carbide Chemicals and Plastics Company Inc., Danbury, Conn. The reactor charge was heated to 190° C. and maintained under a maximum pressure of 2.4 kg./sq.cm. The Monomer Mixture No. 1 listed in Table 1 below, was then added to the reactor over a period of 3 hours. The Monomer Mixture No. 1 contained in weight percentages 46 MMA / 30 BA/ 10 Sty /14 HEMA monomers based on the total weight of the monomer mixture. A mixture of 37.5 grams of DITBP (initiator) supplied by ELF Atochem, of Philadelphia Pa.

(the amount of initiator added in weight percentage based on the weight of the monomer mixture was 2.5%) with 35.0 grams of 2–4 pentandione supplied by J. T. Baker, of Phillipsburg, N.J. was simultaneously added to the reactor over a period of 3.5 hours. The reactor charge was then cooled to 90° C. in 30 minutes. During the cooling period, a mixture of 359.2 grams of Tone 201 reactive diluent, 60.0 grams of 2–4 pentandione and 10.5 grams of Benzoic Acid supplied by J. T. Baker, of Phillipsburg, N.J. were added to the reactor vessel. No gel formation was observed either in the product which appeared crystal clear or on any parts of the reactor, thereby indicating no or negligible gel formation.

TABLE 1

Monomer Mixture No. 1

| | in grams |
|---|---|
| BA | 450 |
| MMA | 690 |
| Sty | 150 |
| HEMA | 220 |

The resultant polymer had a weight average molecular weight of 1,220 and a polydispersity of 5.43. These values reflect a contribution from the polyacrylate as well as the reactive diluent. The weight average molecular weight of only the resultant polymer was 6,626. The polymeric component of Example 1 had a solids content of 90.6 % based on the total weight of the polymeric component, a Brookfield viscosity of 9000 cps @ 25° C. (spindle No. 3 at 6 rpm using a Brookfield Model LVTD-II Viscometer supplied by Brookfield Engineering Laboratories INC., Stoughton, Mass. The polymer had a hydroxy number of 109.5 and HEW of 512 based on solids or HEW of 565 @ 90.6 10 % solids.

EXAMPLE 2

A 4 liter stainless steel reactor vessel equipped with a thermocouple and reactant delivery pumps was charged with 359.2 grams of a reactive diluent known as Tone-201™ polycaprolactone diol, supplied by Union Carbide Chemicals and Plastics Company Inc., Danbury, Conn. The reactor charge was heated to 185° C. and maintained under a maximum pressure of 2.3 kg./sq.cm. The Monomer Mixture No. 2 listed in Table 2 below, was then added to the reactor over a period of 3 hours. The Monomer Mixture No. 2 contained in weight percentages 26MMA/20IBOMA/30BA/10Sty/14HEMA monomers based on the total weight of the monomer mixture. A mixture of 37.5 grams of DITBP (initiator) supplied by ELF Atochem, of Philadelphia Pa. (the amount of initiator added in weight percentage based on the weight of the monomer mixture was 2.5%) with 35.0 grams of 2–4 pentandione supplied by J. T. Baker, of Phillipsburg, N.J. was simultaneously added to the reactor over a period of 3.5 hours. The reactor charge was then cooled to 90° C. in 30 minutes. During the cooling period, a mixture of 359.2 grams of Tone 201 reactive diluent, 60.0 grams of 2–4 pentandione and 10.5 grams of Benzoic Acid supplied by J. T. Baker, of Phillipsburg, N.J. were added to the reactor vessel. No gel formation was observed either in the product which appeared crystal clear or on any parts of the reactor, thereby indicating no or negligible gel formation.

TABLE 2

Monomer Mixture No. 2

| | in grams |
|---|---|
| BA | 450 |
| MMA | 390 |
| Sty | 150 |
| HEMA | 220 |
| IBOMA | 300 |

The polymeric component of Example 2 had a solids content of 90.5 % based on the total weight of the polymeric component, a Brookfield viscosity of 8000 cps @ 25° C. (spindle No. 3 at 6 rpm using a Brookfield Model LVTD-II Viscometer supplied by Brookfield Engineering Laboratories INC., Stoughton, Mass. The polymer had a hydroxy number of 109.5 and HEW of 512 based on solids or HEW of 566 @ 90.6 % solids.

EXAMPLE 3

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 190° C. and maintained under a maximum pressure of 3.4 kg./sq.cm. The Monomer Mixture No. 3 listed in Table 3 below, was then added to the reactor over a period of 3 hours. The Monomer Mixture No. 3 below contained in weight percentages 48MMA/30BA/6Sty/16HEMA monomers based on the total weight of the monomers used in the monomer mixture. A mixture of 30.0 grams of DITBP (initiator) supplied by ELF Atochem, of Philadelphia Pa. (the amount of initiator added in weight percentage based on the weight of the monomer mixture was 1.5%) with 93.1 grams of NBUAC supplied by Ashland Chemical Co., of Columbus, Ohio was simultaneously added to the reactor over a period of 3.5 hours. The reactor charge was then cooled to 90° C. in 30 minutes. During the cooling period, a mixture of 494.3 grams of Tone 201 reactive diluent and 494.3 grams of Pluracol TP-440 supplied by BASF Corp., of Wyandotte, Mich. were added to the reactor vessel. No gel formation was observed either in the product which appeared crystal clear or on any parts of the reactor, thereby indicating no or negligible gel formation.

TABLE 3

Monomer Mixture No 3

| | in grams |
|---|---|
| BA | 600 |
| MMA | 960 |
| sty | 120 |
| HEMA | 320 |

The polymeric component of Example 3 had a VOC content of 299.6 grams per liter (2.5 pounds per gallon), a solids content of 88.9 % based on the total weight of the polymeric component, a Brookfield viscosity of 12,700 cps @ 25° C. (spindle 3 at 6 rpm using a Brookfield Model LVTD-II Viscometer supplied by Brookfield Engineering Laboratories INC., Stoughton, Mass. A hydroxy number of 147.7, HEW of 380 based on solids or HEW of 427 @ 88.9 % solids.

EXAMPLE 4

A 4 liter stainless steel reactor vessel equipped with a thermocouple and reactant delivery pumps was charged with 479.0 grams of a reactive diluent known as Tone-201 polycaprolactone diol, supplied by Union Carbide Chemicals and Plastics Company Inc., Danbury, Conn. The reactor charge was heated to 195° C. and maintained under a maximum pressure of 3.5 kg./sq.cm. The Monomer Mixture No. 4 listed in Table 4 below, was then added to the reactor over a period of 3 hours. The Monomer Mixture No. 4 below contained in weight percentages 46MMA/30BA/10Sty/ 14HEMA monomers based on the total weight of the monomer mixture. A mixture of 50.0 grams of DITBP (initiator) supplied by ELF Atochem, of Philadelphia PA. (the amount of initiator added in weight percentage based on the weight of the monomer mixture was 2.5%) with 46.6 grams of NBUAC supplied by Ashland Chemical Co., of Columbus, Ohio was simultaneously added to the reactor over a period of 3.5 hours. The reactor charge was then cooled to 90° C. in 30 minutes. During the cooling period, a mixture of 479.0 grams of Tone 201 reactive diluent, 60.0 grams of 2–4 pentandione and 10.5 grams of Benzoic Acid supplied by J. T. Baker, of Phillipsburg, N.J. were added to the reactor vessel. No gel formation was observed either in the product which appeared crystal clear or on any parts of the reactor, thereby indicating no or negligible gel formation.

TABLE 4

Monomer Mixture No. 4

| | in grams |
|---|---|
| BA | 600 |
| MMA | 920 |
| Sty | 200 |
| HEMA | 280 |

The polymeric component of Example 4 had a solids content of 90.2 % based on the total weight of the polymeric component, a Brookfield viscosity of 5,900 cps @ 25° C.(spindle 3 at 12 rpm using a Brookfield Model LVTD-II Viscometer supplied by Brookfield Engineering Laboratories INC., Stoughton, Mass. A hydroxy number of 109.5, HEW of 512 based on solids or HEW of 567 @ 90.2 % solids.

EXAMPLE 5

(Conventional)

Example 5 was a conventional product sold by Rohm and Haas Company, Philadelphia, Pa. under the trade name as Acryloid™ AU608S solution polymer having conventional solids level of 60 weight percent based on the total product weight, a Brookfield viscosity of 6500 cps @ 25° C. (spindle No. 3 at 6 rpm) using a Brookfield Model LVTD Viscometer supplied by Brookfield Engineering Laboratories INC., Stoughton, Mass., a VOC content of 539.28 grams per liter (4.5 pounds per gallon).

EXAMPLE 6

(Comparative)

A 4 liter stainless steel reactor vessel equipped with a thermocouple and reactant delivery pumps was charged with 479.0 grams of a reactive diluent known as Tone-201 polycaprolactone diol, supplied by Union Carbide Chemicals and Plastics Company Inc., Danbury, Conn. The reactor charge was heated to 195° C. and maintained under a maximum pressure of 3.5 kg./sq.cm. The Monomer Mixture No. 6 listed in Table 6 below, was then added to the reactor over a period of 3 hours. The Monomer Mixture No. 4 below contained in weight percentages 17MMA/23BA/10Sty/ 50HEMA monomers based on the total weight of the monomers used in the monomer mixture. A mixture of 50.0 grams of DITBP (initiator) supplied by ELF Atochem, of Philadelphia Pa. (the amount of initiator added in weight percentage based on the weight of the monomer mixture was 2.5%) with 46.6 grams of NBUAC supplied by Ashland Chemical Co., of Columbus, Ohio was simultaneously added to the reactor over a period of 3.5 hours. The reactor charge was then cooled to 90° C. in 30 minutes. During the cooling period, a mixture of 479.0 grams of Tone 201 reactive diluent, 126.6 grams of 2-4 pentandione and 14.0 grams of Benzoic Acid supplied by J. T. Baker, of Phillipsburg, N.J. were added to the reactor vessel. Significant gel formation was observed along the dome of the reactor, the product appeared hazy, thus indicating gel formation.

TABLE 6

Monomer Mixture No. 6

| | in grams |
|---|---|
| BA | 460 |
| MMA | 340 |
| Sty | 200 |
| HEMA | 1000 |

The polymeric component of Example 6 had a solids content of 90.6 % based on the total weight of the polymeric component, a Brookfield viscosity of 18,500 cps @ 25° C. (spindle No. 4 at 12 rpm) using a Brookfield Model LVTD-II Viscometer supplied by Brookfield Engineering Laboratories INC., Stoughton, Mass. A hydroxy number of 215, HEW of 261.5 based on solids or HEW of 288.6 @ 90.6 % solids.

EXAMPLE 7

(Comparative)

A 4 liter stainless steel reactor vessel equipped with a thermocouple and reactant delivery pumps was charged with 359.2 grams of a reactive diluent known as Tone-201 polycaprolactone diol, supplied by Union Carbide Chemicals and Plastics Company Inc., Danbury, Conn. The reactor charge was heated to 190° C. and maintained under a maximum pressure of 2.0 kg./sq.cm. The Monomer Mixture No. 7 listed in Table 7 below, was then added to the reactor over a period of 3 hours. The Monomer Mixture No. 7 described below contained in weight percentages 50EHMA/ 50 HEMA monomers based on the total weight of the monomers used in the monomer mixture. A mixture of 50.0 grams of DITBP (initiator) supplied by ELF Atochem, of Philadelphia Pa. (the amount of initiator added in weight percentage based on the weight of the monomer mixture was 2.5%) with 46.6 grams of NBUAC supplied by Ashland Chemical Co., of Columbus, Ohio was simultaneously added to the reactor over a period of 3.5 hours. The reactor charge was then cooled to 90° C. in 30 minutes. During the cooling period, an additional charge of 359.2 grams of Tone 201 reactive diluent was added to the reactor vessel. Substantial gel formation was observed along the dome and the entire reactor system. A significant degree of force (hammer and chisel) was needed to clean the Example 7 polymer out of the reactor. Example 7 was essentially a solid mass of gel of an unmeasurable. viscosity and of no practical use.

TABLE 7

Monomer Mixture No. 7 (Comparative)

| | in grams |
|---|---|
| EHMA | 750 |
| HEMA | 750 |

EXAMPLE 8

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 205° C. and maintained under a maximum pressure of 4.4 kg./sq.cm. The Monomer Mixture No. 8 listed in Table 8 below, was then added to the reactor over a period of 3 hours. The Monomer Mixture No. 8 below contained in weight percentages 25-MMA/30BA-/25-Sty/20HEMA monomers based on the total weight of the monomers used in the monomer mixture. A mixture of 25.0 grams of DITBP (initiator) supplied by ELF Atochem, of Philadelphia Pa. (the amount of initiator added in weight percentage based on the weight of the monomer mixture was 1.25%) with 98.1 grams of NBUAC supplied by Ashland Chemical Co., of Columbus, Ohio was simultaneously added to the reactor over a period of 3.25 hours. The reactor charge was then cooled to 90° C, in 30 minutes. During the cooling period, a charge of 1538 grams of Pluracol TP-440 reactive diluent supplied by BASF Corp., of Wyandotte, Mich. was added to the reactor vessel. No gel formation was observed either in the product which appeared crystal clear or on any parts of the reactor, thereby indicating no or negligible gel formation.

TABLE 8

Monomer Mixture No. 8

| | in grams |
|---|---|
| BA | 600 |
| MMA | 500 |
| Sty | 500 |
| HEMA | 420 |

The polymeric component of Example 8 had a solids content of 91.4 % based on the total weight of the polymeric component, a Brookfield viscosity of 4,970 cps @ 25° C. (spindle NO. 3 at 12 rpm) using a Brookfield Model LVTD-II Viscometer supplied by Brookfield Engineering Laboratories INC., Stoughton, Mass.

EXAMPLE 9

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 205° C. and maintained under a maximum pressure of 4.4 kg./sq.cm. The Monomer Mixture No. 9 listed in Table 9 below was then added to the reactor over a period of 3 hours. The Monomer Mixture No. 9 below contained in weight percentages 25-MMA/30BA/25-Sty /20HEMA monomers based on the total weight of the monomers used in the monomer mixture. A mixture of 25.0 grams of DITBP (initiator) supplied by ELF Atochem, of Philadelphia Pa. (the amount of initiator added in weight percentage based on the weight of the monomer mixture was 1.25%) with 98.1 grams of NBUAC supplied by Ashland Chemical Co., of Columbus, Ohio was simultaneously added to the reactor over a period of 3.25 hours. The reactor charge was then cooled to 90° C. in 30 minutes. During the cooling period, a mixture of 494.3 grams of Tone 201 reactive diluent supplied by-Union Carbide Chemicals and Plastics Company Inc., of Danbury, Conn. and 494.3 grams of Pluracol™ TP-440 supplied by BASF Corp., of Wyandotte, Mich. were added to the reactor vessel. No gel formation was lo observed either in the product which appeared crystal clear or on any parts of the reactor, thereby indicating no or negligible gel formation.

TABLE 9

Monomer Mixture No. 9

| | in grams |
|---|---|
| BA | 600 |
| MMA | 500 |
| Sty | 500 |
| HEMA | 420 |

The polymeric component of Example 9 had a solids content of 89.5 % based on the total weight of the polymeric component, a Brookfield viscosity of 7,070 cps @ 25° C.(spindle No. 3 at 12 rpm) using a Brookfield Model LVTD-II Viscometer supplied by Brookfield Engineering Laboratories INC., Stoughton, Mass.

EXAMPLE 10

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 205° C. and maintained under a maximum pressure of 4.4 kg./sq.cm The Monomer Mixture No. 10 listed in Table 10 below was then added to the reactor over a period of 3 hours. The Monomer Mixture No. 10 below contained in weight percentages 25-MMA/30BA/25-Sty/20HEMA monomers based on the total weight of the monomers used in the monomer mixture. A mixture of 25.0 grams of DITBP (initiator) supplied by ELF Atochem, of Philadelphia Pa. (the amount of initiator added in weight percentage based on the weight of the monomer mixture was 1.25%) with 98.1 grams of NBUAC supplied by Ashland Chemical Co., of Columbus, Ohio was simultaneously added to the reactor over a period of 3.25 hours. The reactor charge was then cooled to 90° C. in 30 minutes. During the cooling period, a charge of 1538 grams of Poly-G-20-112™ reactive diluent supplied by-Olin, of Cheshire, Conn. was added to the reactor vessel. No gel formation was observed either in the product which appeared crystal clear or on any parts of the reactor, thereby indicating no or negligible gel formation.

TABLE 10

Monomer Mixture No. 10

| | in grams |
|---|---|
| BA | 600 |
| MMA | 500 |
| Sty | 500 |
| HEMA | 420 |

The polymeric component of Example 10 had a solids content of 91.3 % based on the total weight of the polymeric component, a Brookfield viscosity of 2,260 cps @ 25° C.(spindle No. 3 at 12 rpm) using a Brookfield Model LVTD-II Viscometer supplied by Brookfield Engineering Laboratories INC., Stoughton, Mass.

EXAMPLE 11

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 205° C. and maintained under a maximum pressure of 4.4 kg./sq.cm. The Monomer Mixture No. 11 listed in Table 11 below was then added to the reactor over a period of 3 hours. The Monomer Mixture No. 11 below contained in weight percentages 25-MMA/30BA-/25-Sty/20HEMA monomers based on the total weight of the monomers used in the monomer mixture. A mixture of 25.0 grams of DITBP (initiator) supplied by ELF Atochem, of Philadelphia Pa. (the amount of initiator added in weight percentage based on the weight of the monomer mixture was 1.25%) with 98.1 grams of NBUAC supplied by Ashland Chemical Co., of Columbus, Ohio was simultaneously added to the reactor over a period of 3.25 hours. The reactor charge was then cooled to 900 C in 30 minutes.

During the cooling period, a charge of 1538 grams of Poly-G-20-265™ reactive diluent supplied by-Olin, of Cheshire, Conn. was added to the reactor vessel. No gel formation was observed either in the product which appeared crystal clear or on any parts of the reactor, thereby indicating no or negligible gel formation.

TABLE 11

Monomer Mixture No. 11

| | in grams |
|---|---|
| BA | 600 |
| MMA | 500 |
| Sty | 500 |
| HEMA | 420 |

The polymeric component of Example 11 had a solids content of 88.7 % based on the total weight of the polymeric component, a Brookfield viscosity of 1,620 cps @ 25° C.(spindle No. 3 at 30 rpm) using a Brookfield Model LVTD-IL Viscometer supplied by Brookfield Engineering Laboratories INC., Stoughton, Mass.

EXAMPLE 12

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 190° C. and maintained under a maximum pressure of 3.7 kg./sq.cm. The Monomer Mixture No. 12 listed in Table 12 below was then added to the reactor over a period of 3 hours. The Monomer Mixture No. 12 below contained in weight percentages 42-MMA135BA/10-Sty/13HEMA monomers based on the total weight of the monomers used in the monomer mixture. A mixture of 30.0 grams of DITBP (initiator) supplied by ELF Atochem, of Philadelphia Pa. (the amount of initiator added in weight percentage based on the weight of the monomer mixture was 1.50%) with 93.1 grams of NBUAC supplied by Ashland Chemical Co., of Columbus, Ohio was simultaneously added to the reactor over a period of 3.25 hours. The reactor charge was then cooled to 90° C. in 30 minutes. During the cooling period, a charge of 493.3 grams of Tone-201 reactive diluent supplied by-Olin, of Cheshire, Conn. and 493.3 grams of Poly-G-55- 173 reactive diluent supplied by-Olin, of Cheshire, Conn. was added to the reactor vessel. No gel formation was observed either in the product which appeared crystal clear or on any parts of the reactor, thereby indicating no or negligible gel formation.

TABLE 12

Monomer Mixture No. 12

| | in grams |
|---|---|
| BA | 700 |
| MMA | 840 |
| Sty | 200 |
| HEMA | 260 |

The polymeric component of Example 12 had a solids content of 89.22 % based on the total weight of the polymeric component, a Brookfield viscosity of 8,140 cps @ 25° C.(spindle No. 3 at 12 rpm) using a Brookfield Model LVTD-II Viscometer supplied by Brookfield Engineering Laboratories INC., Stoughton, Mass.

EXAMPLE 13

A 4 liter stainless steel reactor vessel equipped with a thermocouple and reactant delivery pumps was charged with 184.6 grams of NBUAC, supplied by Ashland Chemical Co., of, Columbus, Ohio. The reactor charge was heated to 190° C. and maintained under a maximum pressure of 3.5 kg./sq.cm. The Monomer Mixture No. 13 listed in Table 13 below was then added to the reactor over a period of 3 hours. The Monomer Mixture No. 13 below contained in weight percentages 51MMA/31BA/5-Sty/13HEMA monomers based on the total weight of the monomers used in the monomer mixture. A mixture of 25.0 grams of DITBP (initiator) supplied by ELF Atochem, of Philadelphia Pa. (the amount of initiator added in weight percentage based on the weight of the monomer mixture was 1.25%) with 98.1 grams of NBUAC supplied by Ashland Chemical Co., of Columbus, Ohio was simultaneously added to the reactor over a period of 3.25 hours. The reactor charge was then cooled to 90° C. in 30 minutes. During the cooling period, a charge of 493.3 grams of TP-440 reactive diluent supplied by BASF Corp., of Wyandotte, Mich. and 493.3 grams of Poly-G-30-112™ reactive diluent supplied by Olin, of Cheshire, Conn. was added to the reactor vessel. No gel formation was observed either in the product which appeared crystal clear or on any parts of the reactor, thereby indicating no or negligible gel formation.

TABLE 13

Monomer Mixture No. 13

| | in grams |
|---|---|
| BA | 620 |
| MMA | 1020 |
| Sty | 100 |
| HEMA | 260 |

The polymeric component of Example 13 had a solids content of 87.6 % based on the total weight of the polymeric component, a Brookfield viscosity of 6,620 cps @ 25° C.(spindle No. 3 at 12 rpm) using a Brookfield Model LVTD-II Viscometer supplied by Brookfield Engineering Laboratories INC., Stoughton, Mass.

From comparative Examples 6 and 7 shown earlier, it is seen that polymers resulting from monomer mixtures containing 50 percent by weight of active hydrogen containing monomer either form a gelled mass or have undesired high viscosity, which is unsuitable for practical coating applications.

Examples 1, 2 and Example 5 (conventional) described earlier, were used as a polymeric component and mixed with a cross linking component supplied by Bayer AG, Pittsburgh, Pa. under the trademark Desmodur® N-3300 isocyanate at a ratio of hydroxyl reactive groups on the crosslinking component (NCO) to hydroxyl groups (OH) on the polymer of 1.2 to form a pot mix. The pot life resulting therefrom is shown in Table 14 below along with the VOC content:

TABLE 14

|  | Pot Life hours | VOC gramss per liter | Percent Solids |
|---|---|---|---|
| Pot Mix from Example 1 | 5 | 299.6 | 90.6 |
| Pot Mix from Example 2 | 5 | 299.6 | 90.5 |
| Pot Mix from Example 5 (conventional) | 7 | 539.28 | 60 |

Layers of the pot mixes from the foregoing Examples 1, 2 and 5 were applied over a bare steel panel with a draw down bar so it would yield a coating of 0.05 mms (2±0.1 mils) dry film thickness. The layers were cured at room temperature for two weeks before the following measurements shown in Table 15 below were obtained.

TABLE 15

| Test Performed on the coatings various pot mixes | Pot mix from Example 1 | Pot mix from Example 2 | Pot mix from Example 5 (Conventional) |
|---|---|---|---|
| Dry-to-touch Time | 7.5 | 7.5 | 1 |
| 20° Gloss | 82 | 82 | 80 |
| 60° Gloss | 89 | 89 | 90 |
| Flexibility | T2 | T1 | T5 |
| Pencil hardness | F | F | H |
| % Adhesion | 97 | 97 | 100 |
| Direct impact | >1.8432 (160) | >1.8432 (160) | 0.6336 (55) |
| Reverse impact | 1.4976 (130) | 1.728 (150) | 0.2304 (20) |
| 10% HNO₃ initial spot test | 5 | 6 | 8 |
| 10% HNO₃ recovered spot test | 6.5 | 7 | 9 |
| MEK rubs | pass | pass | pass |
| Mar resistance | 7 | 8 | 4.5 |

Thus, as seen from Table 15 above, the applicants have unexpectedly discovered that the pot mixes from Examples 1 and 2 of the present invention when compared to a conventional pot mix from Example 5 provide significantly higher solids percentage at a significantly less VOC with a significant increase in the pot life. Furthermore, the coatings resulting from the pot mixes from Examples 1 and 2 having comparable or better performance properties as shown in Table 14 above when compared to a coating from the pot mix of the conventional high VOC Example 5. For example, the coatings resulting from Examples 1 and 2 provide substantial improvement over that from Example 5 with respect to their impact resistance, flexibility and surface mar resistance without significant loss in other properties, such as solvent resistance, gloss and coating hardness.

The applicants have also unexpectedly discovered that, unlike the coating from Example 5, when the coatings from Examples 1 and 2 are subjected to scuffing or surface marring, scuff marks or mars resulting therefrom can be readily removed by a buffing or polishing of the surface. Thus, for example, if the surface of a glossy reaction injection molded (RIM) bumper guard of an automobile coated with a coating of the present invention is scuffed or marred during use, the surface gloss of such a bumper guard can be readily restored by a buffing or polishing of the surface. Such a self healing coating obtained from the composition of the present invention thus, permits the user to maintain a high degree of gloss on coated RIM auto bumper guard even after repeated exposure to scuffing action by, for example, air blown dirt particles to which auto vehicles are routinely exposed.

The applicants have also unexpectedly discovered that by including a certain combination of chemicals in the composition, a ratio of pot life/drying time of the pot mix can be increased. Table 16 below provides the various combinations that were prepared.

TABLE 16

|  | Combination 1* | Combination 2* | Combination 3* | Combination 4* |
|---|---|---|---|---|
| Dibutyl tin dilaurate | 0.01 | 0.01 | 0.01 | 0.01 |
| Benzoic acid | 0 | 0.3 | 0 | 0.3 |
| 2,4 pentane dione | 0 | 0 | 2.0 | 2.0 |

*in weight percent based on the total weight of the thermosetting composition solids The various combinations described in Table 16 were added to pot mixes resulting from mixing the polymer of Example 3 with Desmodur® 3300 isocyanate cross linking component at NCO/OH ration of 1.2. The viscosity in centipoise of the pot mixes was measured every half an hour. The results are reported in Table 17 below. The pot life in hours of these pot mixes is also reported in Table 17 below:

TABLE 17

| Hours | Pot mix 1 (includes Combination 1) viscosity | Pot mix 2 (includes Combination 2) viscosity | Pot mix 3 (includes Combination 3) viscosity | Pot mix 4 (includes Combination 4) viscosity |
|---|---|---|---|---|
| 0 | 200 | 180 | 192 | 180 |
| 0.5 | 310 | 218 | 214 | 195 |
| 1.0 | 828 | 334 | 250 | 232 |
| 1.5 |  | 536 | 303 | 278 |
| 2.0 |  |  | 386 | 320 |
| 2.25 |  |  | 437 | 360 |
| Pot life in hours | 0.75 | 1.25 | 2.0 | 2.25 |

Layers from these various pot mixes were applied with a draw down bar over steel plates and the dry-to-touch time in hours of the layers from the various pot mixes was measured under ASTM D-1640-83. Table 18 below provides the dry-to-touch time in hours and the calculated ratio of pot life/drying time from the various pot mixes:

TABLE 18

|  | Pot mix 1 (includes Combination 1) viscosity | Pot mix 2 (includes Combination 2) viscosity | Pot mix 3 (includes Combination 3) viscosity | Pot mix 4 (includes Combination 4) viscosity |
|---|---|---|---|---|
| Dry-to-touch time | 7 | 5 | 7 | 5 |
| Pot life/drying ratio | 0.11 | 0.25 | 0.29 | 0.45 |

Table 18 above, illustrates applicant's unexpected discovery. Pot mix 4, which contained Combination 4 had a higher pot life/drying time ratio than the pot life/drying time ratios from the pot mixes of comparative Combinations 1, 2 and 3. Thus, it is seen that it was the combination of all three chemicals, i.e., the catalyst, carboxylic acid and the extender that provided the pot mix with an increased pot life/drying time ratio than those other pot mixes, which did not contain Combination 4.

What is claimed is:

1. A low VOC ultra high solids thermosetting coating composition comprising:

a polymeric component which comprises a polymer and a reactive diluent, said polymer resulting from polymerization in the presence of said reactive diluent of a monomer mixture comprising in the range of from 5 weight percent to 45 weight percent of at least one active hydrogen containing monomer, said weight percentages being based on the total weight of polymeric component solids and said polymer having a GPC weight average molecular weight varying in the range of from 3,000 to 12,000; and an isocyanate crosslinking component wherein the ratio of active hydrogen reactive groups on said isocyanate crosslinking component to active hydrogen groups on said polymeric component varies in the range of from 1.0 to 1.4.

2. The thermosetting composition of claim 1 wherein the polymeric component comprises in the range of from 10 weight percent to 50 weight percent of said reactive diluent, all percentages being based on the total weight of the polymeric component.

3. The thermosetting composition of claim 1 wherein said the polymeric component further comprises a catalyst.

4. The thermosetting composition of claim 1 wherein said the polymeric component further comprises a solvent.

* * * * *